United States Patent Office 3,285,960
Patented Nov. 15, 1966

3,285,960
4,4-DIPHENYLCYCLOHEXYLAMINE DERIVATIVES
Isaac Frederick Halverstadt, Berkeley, Calif., assignor to Cutter Laboratories, Inc., a corporation of Delaware
No Drawing. Filed Jan. 14, 1964, Ser. No. 337,539
12 Claims. (Cl. 260—570)

This application is a continuation-in-part of application Serial No. 153,684, filed November 20, 1961, and now abandoned.

This invention relates to cyclohexylamine compounds, more particularly 4,4-diphenylcyclohexylamine compounds, and to processes for the preparation of such compositions.

The invention in its composition aspect resides in the concept of a chemical compound having a molecular structure in which two phenyl groups are attached to the 4-position carbon atom of the cyclohexyl ring of cyclohexylamine and at least one oxy oxygen atom-bearing lower-alkyl group is attached to the amino nitrogen atom providing an at least two carbon atom bridge between the nitrogen atom and the oxygen atom.

The invention in its process aspect resides in the concept of embodying such molecular structures in tangible form by the reductive amination of a 4,4-diphenylcyclohexanone with an N-hydroxy-lower-alkyl primary amine or by the condensation of a 4,4-diphenylcyclohexanone with an N-(hydroxy-lower-alkyl)-secondary amine, and catalytically reducing the intermediate 4,4-diphenylcyclohexenylamine with hydrogen. As used herein, the term "lower-alkyl" means an alkyl group containing up to eight carbon atoms, preferably less than 5. The lower-alkyl group can bear simple, non-interfering groups. The term "oxy oxygen atom" means an oxygen atom single bonded to a carbon atom of the amino-lower-alkyl group, e.g., an oxygen atom of a hydroxy, lower-alkoxy including methoxy, ethoxy, propoxy, acyloxy of 1 to 12 carbon atoms including acetoxy, benzoxy, phenylacetoxy, hemi-succinoyloxy, hydroxy-lower-alkoxy, carbamyloxy, alkylcarbamyloxy, dialkylcarbamyloxy, carbonate, chlorocarbonate, phosphate, sulfate or sulfonate group.

As used herein, the term "phenyl" means the monovalent radical obtained when a hydrogen atom attached to a ring carbon atom of benzene is removed. The substitution of one or more simple moieties on one or both of the phenyl rings of the compounds of this invention, such as lower-alkyl, halo, lower-alkoxy, trifluoromethyl, nitro, sulfo, di-lower-alkylamino, dioxymethylene, hydroxy, carboxy, carb-lower-alkoxy and lower-acyloxy, does not adversely affect the pharmacological activity of the compositions bearing phenyl rings in the 4-position and such substituted compounds are the full equivalents of the corresponding unsubstituted compositions.

The compounds of this invention possess pharmacological activity as a result of the structural combination of the two phenyl groups attached to the 4-position carbon atom of the cyclohexyl ring and the oxy oxygen atom-bearing lower-alkyl group attached to the amino nitrogen atom. For this reason, the phenyl and N-lower-alkyl groups can bear simple substituents, the oxy oxygen atom can be part of a variety of single bonded oxygenated groups, and the remaining valence of the nitrogen atom can be satisfied by a hydrogen atom, a lower-alkyl group, another oxy oxygen atom-bearing alkyl group as defined above, without loss of pharmacological activity, so long as this structural combination is retained as the predominant characteristic of the molecule. Thus, the compounds of this invention can be characterized by the general formula

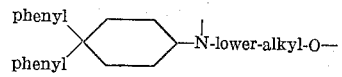

Of these, preferred are those which can be represented by the formula

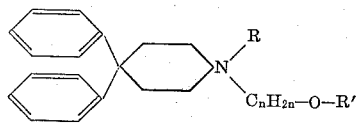

in which R is hydrogen, lower-alkyl, or $-C_nH_{2n}-O-R'$, $n$ is an integer from 2 to 4, and R' is hydrogen, lower-alkyl, acyl, carbamyl, including N-lower-alkyl-carbamyl and N,N-di-lower-alkylcarbamyl, or a bond joining R to form with N a morpholine ring. Included are N-hydroxy-lower-alkyl-, N,N-di-(hydroxy-lower-alkyl)-, N-hydroxy-lower-alkyl-N-lower-alkyl-, N-lower-alkoxy-lower-alkyl-, N,N-di-(lower-alkoxy-lower-alkyl)-, N-lower-alkoxy-lower-alkyl-, N-lower-alkyl-, N-carbamyloxy-lower-alkyl-, N,N-di-(carbamyloxy-lower-alkyl)-, N-carbamyloxy-lower-alkyl-N-lower-alkoxyalkyl-, N-acyloxy-lower-alkyl-, N,N-di-(acyloxy-lower-alkyl)-, N-oxy-bisethylene-, and N-acyloxy-lower-alkyl-N-lower-alkyl-4,4-diphenylcyclohexylamine and each of the corresponding groups of compounds in which one or both of the phenyl groups bears one or more of the phenyl substituents described above.

The physical embodiments of the subject matter sought to be patented are, in their free base form, high-boiling oils or solids melting below 150 degrees centigrade, which possess the inherent applied use characteristics of exhibiting pronounced pharmacological activity as shown by standard test procedures in animals and thus have utility as pharmacologics, e.g., as local anesthetics, anti-inflammatory, anti-spasmodic and anti-lipase agents.

The free base compositions of this invention are most conveniently prepared by the condensation of 4,4-diphenylcyclohexanone with an oxy oxygen atom substituted lower-alkyl primary amine, e.g., a hydroxy-lower-alkyl amine, or secondary amine, e.g., a bis-hydroxylower-alkylamine or a lower-alkyl, hydroxylower-alkylamine. When the reactant amine is a primary amine, the compounds of this invention are most conveniently prepared in a single step reductive amination reaction. The condensation of, e.g., 4,4-diphenylcyclohexanone with the reactant primary amine is effected in the presence of hydrogen and a hydrogenation catalyst so that no intermediate olefin compound is isolated. When the reactant amine is a secondary amine, the compounds of this invention are most conveniently prepared in two steps. For example, 4,4-diphenylcyclohexanone is condensed with the reactant secondary amine in the presence of an acid catalyst. Suitable acid catalysts include mineral acids and strongly acidic cation exchange resins such as those of the Dowex 50 series, which are sulfonated polystyrene ion exchange resins, the styrene being cross-linked by means of divinylbenzene. The intermediate N,N-disubstituted-4,4-diphenylcyclohexenylamine is isolated and then catalytically reduced with hydrogen under mild conditions to the corresponding N,N-disubstituted-4,4-diphenylcyclohexylamine.

The acid-addition salts of this invention can be prepared in a conventional manner by reacting the corresponding free bases with the usual inorganic acids, for example, hydrochloric, hydrobromic, hydriodic, sulfuric and phosphoric, or an organic acid, for example, acetic, oxalic, tartaric, lactic, citric, and benzoic. The acid-addition salts of this invention are readily interconvertible into the free base form and are fully equivalent thereto. The conventional treatment of the acid-addition salt with an inorganic base regenerates the free base form. Thus, all acid addition salts are useful for isolation, characterization or purification of the free base. The pharmacologically acceptable salts, i.e., those not substantially adversely affecting the toxicity of the free base, are useful when the compounds are to be used as pharmacological agents. The quaternary ammonium salts, e.g., methiodide, methobromide, ethiodide, are also within the scope of this invention as obvious variants.

The ester forms of the compounds of this invention can be prepared by a variety of conventional procedures. For example, the N-hydroxylower-alkyl and the N,N-di-(hydroxylower-alkyl) compounds can be mono- or diesterified to produce the mono or diester, e.g., acylate, carbonate, sulfate, phosphate or alkylcarbonate.

The acid addition salts of the free bases of this invention have the same general pharmacological properties as the free bases. Because of their greater water solubility, the acid addition salts are most often employed in pharmacological preparations.

The 2,2-diphenylcyclohexyl compounds isomeric to the compounds of this invention, while not the equivalents thereof, also possess useful pharmacological activity, including local anesthetic and CNS stimulant activity. These compounds can be produced by alkylation of a 2,2-diphenyl-substituted-cyclohexylamine. An example of this reaction is the alkylation of 2,2-diphenyl-cyclohexylamine with ethylenebromohydrin, ethylene chlorohydrin or ethylene oxide to produce N-β-hydroxyethyl-2,2-diphenylcyclohexylamine. The tertiary amino compounds are prepared with greater difficulty and require more drastic alkylation conditions, e.g., those commonly employed with amines which alkylate with difficulty. Other alkylation procedures known in the art can be employed to produce other N-(oxy oxygen atom substituted lower-alkyl)-2,2-diphenylcyclohexylamines. The ester forms can be produced in the same manner as described herein for the 4,4-diphenyl compounds. Representative N-oxy oxygen atom bearing lower-alkyl-2,2-diphenylcyclohexylamines include N-hydroxylower-alkyl-, N,N-di-(hydroxylower-alkyl)-, N-hydroxylower-alkyl-N-lower-alkyl-, N-lower-alkoxylower-alkyl, N,N-di-(loweralkoxy-lower-alkyl)-, N-lower-alkoxylower-alkyl-N-lower-alkyl-, N-carbamyloxy-lower-alkyl-, N,N-di-(carbamyloxy-lower-alkyl)-, N-carbamyloxy-lower alkyl-N-lower-alkoxyalkyl-, N-acyloxy-lower-alkyl-, N,N-di-(acyloxy-lower-alkyl)-, and N-acyloxylower-alkyl-N-lower-alkyl-2,2-diphenylcyclohexylamine.

The foregoing discussion and the following preparations and examples are offered to illustrate methods suitable for the practice of this invention and not to limit its scope.

PREPARATION 1.—4,4-DIPHENYL-2-CYCLOHEXEN-1-ONE

A solution of 477 grams (2.43 moles) of diphenylacetaldehyde in 1500 milliliters of methanol was stirred under a nitrogen atmosphere and cooled to 5 degrees centigrade. A cold solution of sodium methylate, freshly prepared by reacting 56 gram (2.43 atoms) of sodium with 1500 milliliters of methanol, was added. Stirring was continued and a solution of 187 grams (2.68 moles) of methyl vinyl ketone in 1500 milliliters of methanol was added over a period of two hours to the reaction mixture kept at ice bath temperature. The reaction mixture was allowed to warm to room temperature overnight and then heated at 60 degrees centigrade for four hours, cooled to 45 degrees centigrade, and acidified to pH 6 by the addition of 140 milliliters (2.45 moles) of glacial acetic acid. The flow of nitrogen was stopped and the solution concentrated by distillation at atmospheric pressure until the vapor temperature reached 96–98 degrees centigrade. The residue was cooled, treated with 1500 milliliters of ether plus 200 milliliters of water, and filtered to clarify. The two phases were then combined with those of a duplicate run plus one liter of ether and the aqueous phase separated and extracted with two 500 milliliter portions of ether. The ether phases were combined, washed with two 150 milliliter portions of water and set aside. Some 18 grams of oil was recovered by ether extraction of the residues left from the clarifying filtration; this oil was added to the main ether solution and the latter treated with one liter of benzene and distilled until the vapor temperature reached 65 degrees centigrade at atmospheric pressure. The residue was dried by azeotropic distillation in the presence of a Dean-Stark moisture trap and then fractionally distilled. Fractions boiling at 105–155, 155–190 and 190–210 degrees centigrade at 0.25 millimeter were collected. Forty grams of unreacted diphenylacetaldehyde was recovered by redistillation of the first fraction. The third fraction was added to this new pot residue resulting from the redistillation of the first fraction and a small intermediate fraction was collected and united with the main second fraction. An 827 gram aliquot of the 883 gram main fraction was recrystallized from ether to give 629 grams of product melting at 92–93 degrees centigrade. The 629 gram portion was again recrystallized from ether to give 572 grams of 4,4-diphenyl-2-cyclohexen-1-one melting at 96.5–98.5 degrees centigrade. Concentration of the mother liquors gave an additional 42 grams of product melting at 97–99 degrees centigrade. After work up of the various mother and wash liquors, the yield of 4,4-diphenyl-2-cyclohexen-1-one was 749 grams.

*Analysis.*—Calculated for $C_{18}H_{16}O$: C, 87.06; H, 6.49. Found: C, 86.56; H, 6.31.

PREPARATION 2.—4,4-BIS(4-METHOXYPHENYL)-2-CYCLOHEXEN-1-ONE

A mixture of 94.1 grams (0.367 mole) of bis(4-methoxyphenyl)acetaldehyde in 225 milliliters of warm methanol was stirred under nitrogen and treated quickly with a solution of sodium methylate prepared by reacting 11 grams (0.48 atom) of sodium with 225 milliliters of methanol. The solution was stirred and held at approximately 50 degrees centigrade while a solution of 28.55 grams (0.408 mole) of methyl vinyl ketone in 175 milliliters of methanol was added in 100 minutes. After an additional hour of heating and stirring the mixture was acidified with 28.5 milliliters (0.49 mole) of glacial acetic acid and treated with 80 milliliters of water. The solvent was distilled at atmospheric pressure until the vapor temperature reached 95 degrees centigrade. The residual red oil was distributed between 100 milliliters of water and 500 milliliters of ether and the aqueous phase was re-extracted with two 100 milliliter portions of ether. The ethereal solutions were combined, washed with water and dried over anhydrous magnesium sulfate. The drying agent was filtered and the filtrate was distilled to yield 71.3 grams of crude 4,4-bis(4-methoxyphenyl)-2-cyclohexen-1-one, boiling at 206–250 degrees centigrade at 0.4 millimeters pressure.

PREPARATION 3.—4,4-DIPHENYLCYCLOHEXAN-ONE

A solution of 100 grams (0.403 mole) of 4,4-diphenyl-2-cyclohexen-1-one (Preparation 1) in 800 milliliters of ethyl acetate was treated with 1.5 grams of 10 percent palladium on carbon catalyst and hydrogenated at an initial pressure of about 40 pounds per square inch. The hydrogen uptake ceased at approximately one mole after two hours. The contents of the reaction vessel were combined with those from a duplicate run, warmed on a steam bath to dissolve some crystals and filtered to remove the catalyst. The clear filtrate was concentrated to a weight of 320 grams and allowed to crystallize overnight at room temperature. The product was filtered and washed with two 75 milliliter portions of solvent to give 181 grams of crude product which was recrystallized from ethyl acetate. There was obtained 166.5 grams or an 83 percent yield of 4,4-diphenylcyclohexanone melting at 144.5–146.5 degrees centigrade. Other similar preparations of this compound gave yields of 84 to 91 percent.

*Analysis.*—Calculated for $C_{18}H_{18}O$: C, 86.36; H, 7.25. Found: C, 85.86; H, 7.23.

PREPARATION 4.—4,4-BIS(4-METHOXYPHENYL) CYCLOHEXANONE 71.3 grams of crude 4,4-bis(4-methoxyphenyl)-2-cyclohexen-1-one (Preparation 2) was mixed with 525 milliliters of ethyl acetate and 2 grams of 10 percent palladium-on-carbon catalyst and hydrogenated at an initial pressure of 50 pounds per square inch. The hydrogen uptake ceased at slightly in excess of one mole after 50 minutes. The catalyst was filtered and the solvent was evaporated from the filtrate to yield a crude crystalline product. This was washed with isopropanol and recrystallized from 80 milliliters of isopropanol to yield 46.3 grams of 4,4-bis(4-methoxyphenyl)cyclohexanone, melting at 84–86.5 degrees centigrade.

*Analysis.*—Calculated for $C_{20}H_{22}O_3$: C, 77.39; H, 7.14. Found: C, 77.24; H, 7.16.

PREPARATION 5.—BIS(4-METHYLPHENYL) ACETALDEHYDE

A mixture of 8.85 grams (0.37 mole) of 4,4′-dimethylbenzoin and 25 grams of activated Raney nickel catalyst in 250 milliliters of absolute ethanol was shaken with hydrogen at an initial pressure of 49 pounds per square inch and at 50–60 degrees centigrade for 15 hours until approximately one mole of hydrogen had been absorbed. It was diluted with 400 milliliters of ethanol, refluxed briefly to dissolve the organic precipitate and filtered while hot to remove the catalyst. The filtrate was concentrated from a steam bath, finally under water aspirator vacuum, to give a crystalline mixture of 4,4′-dimethylhydrobenzoin and 4,4′-dimethylisohydrobenzoin which weighed 89 grams.

This crude product was heated with 400 milliliters of dichloroacetic acid at 135 degrees centigrade for three and one-half hours. Most of the dichloroacetic acid was recovered by distillation and the hot residue was dissolved in 250 milliliters of dichloromethane. This solution was washed with aqueous potassium carbonate and with water and dried over anhydrous magnesium sulfate. The drying agent was filtered out and the filtrate was distilled to yield material boiling at 160–185 degrees centigrade at 2 millimeters pressure and a small fraction boiling somewhat higher. Since these contained traces of acid they were recombined in methylene chloride, washed, dried, and refractionated to yield 44.71 grams of bis(4-methylphenyl)acetaldehyde boiling at 125–135 degrees centigrade at 0.25 millimeter pressure.

PREPARATION 6.—4,4-BIS(4-CHLOROPHENYL)-2-CYCLOHEXANONE

By the general method used to prepare 4,4-bis(4-methoxyphenyl) - 2 - cyclohexen-1-one, 617.4 grams (2.33 moles) of bis(4-chlorophenyl)acetaldehyde was converted to 380 grams of crude 4,4-bis(4-chlorophenyl)-2-cyclohexen-1-one, boiling at about 165–195 degrees centigrade at 0.25 millimeter pressure and a 136 gram fraction boiling at about 195–225 degrees centigrade at 0.25 millimeter pressure.

By the general method used to prepare 4,4-bis(4-methoxyphenyl)cyclohexanone, the two fractions of 4,4-bis(4-chlorophenyl)-2-cyclohexen-1-one were hydrogenated to 273 grams of 4,4-bis(4-chlorophenyl)cyclohexanone, melting at 87–91 degrees centigrade and 89 grams of a polymorph of this same ketone, melting at 153–154 degrees centigrade. The infrared absorption curves of the two forms are indistinguishable from each other. The analysis below is for the higher melting form.

*Analysis.*—Calculated for $C_{18}H_{16}Cl_2O$: C, 67.72; H, 5.05. Found: C, 67.80; H, 5.24.

PREPARATION 7.—4,4-BIS(4-METHYLPHENYL) CYCLOHEXANONE

A solution of sodium methylate was prepared by reacting 5.1 grams (0.22 atom) of sodium with 150 milliliters of methanol. Five milliliters of this solution was added to 150 milliliters of methanol and 50.0 grams (0.223 mole) of bis(4-methylphenyl)acetaldehyde (Preparation 5) was dissolved in it. The remainder of the first sodium methylate solution was stirred under nitrogen, treated with the aldehyde solution, warmed to 40 degrees centigrade and treated with a solution of 17.2 grams (0.245 mole) of methyl vinyl ketone in 50 milliliters of methanol in 75 minutes. After stirring for an additional four hours, the reddish-orange solution stood under nitrogen overnight and was then acidified to pH 6 with 13.2 milliliters (0.22 mole) of glacial acetic acid. The nitrogen was shut off, 150 milliliters of water was added and the solution was distilled under atmospheric pressure until the head temperature reached 95 degrees centigrade. The residue was cooled, extracted with 200 milliliters of ether and with two 25 milliliter portions of ether. The organic extracts were combined, dried over anhydrous magnesium sulfate, filtered, and distilled to yield, after a forerun of adlehyde, the crude 4,4-bis(4-methylphenyl)-2-cyclohexen-1-one, 39.32 grams boiling at 170–210 degrees centigrade at 0.3 millimeter pressure.

This crude unsaturated ketone was dissolved in 250 milliliters of ethyl acetate, treated with 800 milligrams of 10 percent palladium-on-carbon and hydrogenated at an initial pressure of 44 pounds per square inch. After 17 hours the hydrogen uptake had ceased at approximately 0.6 mole. The mixture was diluted with an equal volume of fresh solvent and warmed and filtered. The filtrate was concentrated to 62 grams and crystallized. The crystals were filtered, washed with three 10 milliliter portions of ethyl acetate and recrystallized by hot extraction on a soxhlet thimble into 40 milliliters of ethyl acetate. The product was filtered, washed and dried to yield 15.00 grams of 4,4-bis(4-methylphenyl)cyclohexanone, melting at 173–174.5 degrees centigrade.

*Analysis.*—Calculated for $C_{20}H_{22}O$: C, 86.29; H, 7.97. Found: C, 86.20; H, 7.95.

PREPARATION 8.—2,2′-(4,4-DIPHENYLCYCLOHEXENYLIMINO)DIETHANOL

A solution of 6.10 grams (0.058 mole) of 2,2′-iminodiethanol in 125 milliliters of benzene and 0.25 grams of the acid form of Dowex 50W–X8, a sulfonated polystyrene cross-linked by means of 8 percent of divinylbenzene, was dried by refluxing for 30 minutes and collecting the azeotroped water in a Dean-Stark trap. Then 12.00 grams (0.048 mole) of 4,4-diphenylcyclohexanone (Preparation 3) was added and the refluxing continued overnight (20 hours), at which time the theoretical amount of water had been collected. The catalyst was filtered off and the filtrate concentrated on a steam bath, under water aspirator pressure, to give 17.45 grams of a low melting solid, 2,2′-(4,4-diphenylcyclohexenylimino)diethanol.

PREPARATION 9.—3-[(4,4-DIPHENYLCYCLOHEXENYL)(2-HYDROXYETHYL)AMINO]-2-PROPANOL

A solution of 5.72 grams (0.048 mole) of 1-[(2-hydroxyethyl)amino]-2-propanol in 125 milliliters of benzene was refluxed with 0.4 gram of the acid form of Dowex 50W–X8 under a Dean-Stark trap for 90 minutes to dry the system. The collected water was discarded and 10.00 grams (0.040 mole) of 4,4-diphenylcyclohexanone (Preparation 3) was added. After 24 hours of refluxing when the theoretical amount of water had been collected, the catalyst was filtered off and the filtrate concentrated on a steam bath, finally under aspirator vacuum, to yield 15.1 grams of 3-[(4,4-diphenyl-1-cyclohexenyl)(2-hydroxyethyl)amino]-2-propanol as a thick oil.

PREPARATION 10.—2-[(4,4-DIPHENYLCYCLO-HEXENYL)METHYLAMINO]ETHANOL

A solution of 3.60 grams (0.048 mole) of 2-methylaminoethanol in 100 milliliters of benzene was refluxed with 0.5 grams of the acid form of Dowex 50W–X8 under a Dean-Stark trap for one hour. The collected water was discarded and 10.00 grams (0.040 mole) of 4,4-diphenylcyclohexanone (Preparation 3) was added to the mixture. Water was evolved rapidly and the reaction was complete in 22 hours. The catalyst was filtered off and the filtrate was concentrated on a steam bath, under aspirator vacuum, to 12.64 grams of 2-[(4,4-diphenyl-1-cyclohexenyl)methylamino]ethanol as a thick oil.

PREPARATION 11.—2,2' - [4,4 - BIS(4 - METHOXYPHENYL)CYCLOHEXENYLIMINO]DIETHANOL

A solution of 10.3 grams (0.10 mole) of 2,2'-iminodiethanol in 200 milliliters of benzene was mixed with 0.5 gram of the acid form of Dowex 50, a sulfonated polystyrene catalyst, and dried by refluxing under a Dean-Stark trap. This mixture was treated with 20.00 grams (0.064 mole) of 4,4-bis(4-methoxyphenyl)cyclohexanone and refluxed for 20 hours until the theoretical amount of water had been evolved. The catalyst was filtered and the filtrate was concentrated to yield 31.5 grams of crude 2,2' - [4,4 - bis(4 - methoxyphenyl)cyclohexenylimino]diethanol.

PREPARATION 12.—N,N-BIS(2-ETHOXYETHYL)-4,4-DIPHENYL-1-CYCLOHEXENYLAMINE

A solution of 25.80 grams (0.16 mole) of bis(2-ethoxyethyl)amine in 125 milliliters of benzene was treated with 1.90 grams (0.010 mole) of p-toluenesulfonic acid monohydrate and refluxed under a Dean-Stark trap for three hours to dry the system. Twenty grams (0.080 mole) of 4,4-diphenylcyclohexanone was added, and after 38 hours of refluxing the theoretical amount of water had been collected. The solvent was distilled, first at atmospheric pressure and finally at 20 millimeters pressure to yield 45.00 grams of liquid crude product. This contained the desired N,N-bis(2-ethoxyethyl) - 4,4 - diphenyl - 1 - cyclohexenylamine plus the excess bis(2-ethoxyethyl)amine and p-toluenesulfonate.

PREPARATION 13.—2,2' - [4,4 - BIS(4 - METHYLPHENYL)CYCLOHEXENYLIMINO]DIETHANOL

A solution of 6.90 grams (0.066 mole) of 2,2'-iminodiethanol in 150 milliliters of benzene and 0.5 gram of the acid form of Dowex 50, a sulfonated polystyrene catalyst, was dried by refluxing it under a Dean-Stark trap for five hours. This mixture was treated with 14.50 grams (0.0525 mole) of 4,4-bis(4-methylphenyl)cyclohexanone and refluxed under the trap for 23 hours. Since the theoretical amount of water had not yet been collected in the trap, 1.90 grams (0.01 mole) of p-toluene sulfonic acid monohydrate and 4.5 grams (0.043 mole) of 2,2'-iminodiethanol were added and the mixture was stirred by a magnetic stirrer. After an extended period of additional refluxing, the reaction was terminated although the theoretical amount of water had not been collected. The warm solution was decanted from excess 2,2'-iminodiethanol, the catalyst was filtered out and the filtrate was concentrated from a steam bath, finally at 20 millimeters pressure to yield 20.5 grams of crude 2,2'-[4,4-bis(4-methylphenyl)cyclohexenylimino]diethanol, a thick pale yellowish oil which slowly crystallized on standing.

*Example 1.—2,2'-(4,4-diphenylcyclohexylimino)diethanol*

The 17.45 grams of low melt 2,2'-(4,4-diphenylcyclohexenylimino)diethanol from Preparation 8 was dissolved in 200 milliliters of methanol, treated with 500 milligrams of platinum oxide and hydrogenated at an initial pressure of 60 pounds per square inch. After 40 hours, hydrogen absorption had ceased at approximately the theoretical. The catalyst was filtered off and the filtrate concentrated on a steam bath, finally at 25 millimeters pressure, to a colorless oil. This was dissolved in 150 milliliters of ether, washed with two 10 milliliter portions of water, and dried over magnesium sulfate. The solid was filtered off, washed well with ether, and the solvent evaporated to leave 15.57 grams of 2,2'-(4,4-diphenylcyclohexylimino)diethanol as an oil.

To a solution of the above oil in 15 milliliters of methanol, there was added 13.1 milliliters (0.046 mole) of hydrogen chloride in dry ether. The hydrochloride was separated by filtration, washed with 10 milliliters of 1:2 methanol:ether followed by 10 milliliters of dry ether, and dried. There was obtained 11.24 grams or a 62 percent yield of 2,2'-(4,4-diphenylcyclohexylimino)diethanol hydrochloride melting at 176.5–179.5 degrees centigrade.

*Analysis.*—Calculated for $C_{22}H_{30}ClNO$: C, 70.29; H, 8.04; Cl, 9.43. Found: C, 70.07; H, 7.88; Cl, 9.20.

*Example 2.—1-[(4,4-diphenylcyclohexyl)(2-hydroxyethyl)amino]-2-propanol*

The 15.1 grams of 3-[(4,4-diphenyl-1-cyclohexenyl)(2-hydroxyethyl)amino]-2-propanol from Preparation 9 was dissolved in 100 milliliters of methanol and shaken with 0.5 gram of Adams' catalyst at an initial pressure of 60 pounds per square inch of hydrogen. The hydrogenation proceeded slowly and after 32 hours absorption had stopped at 92 percent of the theoretical amount. The catalyst was filtered off and the filtrate was concentrated to a thick oil. The residue was dissolved in 100 milliliters of methylene chloride, washed with three 10 milliliter portions of water, treated with 50 milliliters of benzene, and concentrated on a steam bath, finally under aspirator vacuum, to give 14.5 grams of 1-[(4,4'-diphenylcyclohexyl)(2-hydroxyethyl)amino]-2-propanol as an oil.

To a solution of the above oil in 12 milliliters of methanol, there was added 10 milliliters (0.039 mole) of hydrogen chloride in ether. The solvent was distilled and the residual oil evaporated on a steam bath with two successive 25 milliliter portions of isopropyl alcohol to remove excess hydrogen chloride. The remaining syrup was dissolved in 10 milliliters of methanol plus 10 milliliters of acetone and diluted with 40 milliliters of dry ether. The crystals which formed on standing overnight at room temperature were filtered, washed with two 10 milliliter portions of 1:3 acetone-ether followed by two 10 milliliter portions of dry ether, and dried to give 11.81 grams of 1-[(4,4-diphenylcyclohexyl)(2 - hydroxyethyl)]amino - 2-propanol hydrochloride melting at 179.5–181.5 degrees centigrade.

*Analysis.*—Calculated for $C_{23}H_{32}ClNO_2$: C, 70.84; H, 8.27; Cl, 9.09. Found: C, 70.95; H, 8.22; Cl, 9.22.

*Example 3.—2-[(4,4-diphenylcyclohexyl)methylamino]ethanol*

The 12.64 grams of crude 2-[(4,4-diphenylcyclohexenyl)methylamino]ethanol from Preparation 10 was dissolved in 100 milliliters of methanol and shaken with 0.2 gram of Adams' catalyst at an initial hydrogen pressure of 60 pounds per square inch. After 10 hours the hydrogen absorption had ceased at nearly the theoretical value. The catalyst was filtered off and the filtrate was concentrated to 12.25 grams of an oil. This oil was dissolved in 100 milliliters of methylene dichloride, washed with three 10 milliliter portions of water, treated with 50 milliliters of benzene and concentrated on a steam bath, finally under aspirator vacuum, to leave 2-[(4,4-diphenylcyclohexyl)methylamino]ethanol as a thick oil.

To a solution of the above oil in 12 milliliters of methanol, there was added 9 milliliters (0.035 mole) of hydrogen chloride in ether. After standing overnight, the hydrochloride was collected by filtration, washed with two 10 milliliters portions of 1:2 methanol:ether followed by two 10 milliliter portions of ether, and dried to yield 10.26 grams of 2-[(4,4-diphenylcyclohexyl)methylamino]ethanol hydrochloride melting at 199.5–201.5 degrees centigrade. On recrystallization from 1:2 methanol:ether, there was obtained 9.89 grams or a 72 percent yield of the hydrochloride melting at 200.5–203 degrees centigrade.

*Analysis.*—Calculated for $C_{21}H_{28}ClNO$: C, 72.92; H, 8.16; Cl, 10.25. Found: C, 72.91; H, 8.11; Cl, 10.14.

Example 4.—2-(4,4-diphenylcyclohexylamino)ethanol

A solution of 10.00 grams (0.040 mole) of 4,4-diphenyl-cyclohexanone and 3.05 grams (0.050 mole) of 2-aminoethanol in 100 milliliters of methanol was shaken with 0.1 gram of Adams' catalyst at an initial hydrogen pressure of 55 pounds per square inch. The hydrogen absorption ceased at approximately the theoretical amount in 40 minutes. The catalyst was filtered off and the solvent was removed under aspirator vacuum to leave 12.25 grams of oil which crystallized on standing, melting at 80–96 degrees centigrade. It was dissolved in 15 milliliters of methanol and acidified with 11.0 milliliters (0.043 mole) of hydrogen chloride in dry ether. Dry ether was added to make the methanol:ether ratio 1:1. After standing overnight the product was filtered, washed with two 5 milliliter portions of mixed solvent and with two 10 milliliter portions of dry ether and dried to give 10.80 grams or 82 percent yield of 2-(4,4-diphenylcyclohexylamino) ethanol hydrochloride melting at 197–198 degrees centigrade. The compound is hygroscopic but not deliquescent.

*Analysis.*—Calculated for $C_{20}H_{26}ClNO$: C, 72.38; H, 7.90; Cl, 10.68. Found: C, 72.2; H, 8.1; Cl, 10.67.

Example 5.—3-(4,4-diphenylcyclohexylamino)propanol

A solution of 10.00 grams (0.040 mole) of 4,4-diphenyl-cyclohexanone and 3.75 grams (0.050 mole) of 3-aminopropanol in 100 milliliters of methanol was shaken with 0.1 gram of Adams' catalyst at an initial hydrogen pressure of 57 pounds per square inch. The hydrogen absorption ceased at approximately 90 percent of the theoretical amount in two hours. The contents of the vessel were warmed with an additional 150 milliliters of methanol to dissolve the product. This was filtered while hot to remove the catalyst and the filtrate was concentrated on a steam bath, finally under aspirator vacuum, to remove solvent and excess aminopropanol. The crystalline residue, melting at 157–160 degrees was dissolved in 250 milliliters of hot methanol, cooled briefly, and acidified with 10.5 milliliters (0.041 mole) of hydrogen chloride in dry ether. This solution was concentrated from a steam bath until 13 milliliters of methanol remained in it, and diluted with 26 milliliters of dry ether. After two hours the crystalline product was filtered, washed with two 12 milliliter portions of mixed solvent, with two 15 milliliter portions of dry ether and dried to yield 9.05 grams of 3-(4,4-diphenylcyclohexylamino)propanol hydrochloride melting at 190–191.5 degrees centigrade.

*Analysis.*—Calculated for $C_{21}H_{28}ClNO$: C, 72.92; H, 8.16; Cl, 10.25. Found: C, 73.14; H, 8.22; Cl, 9.99.

Example 6.—3-(4,4-diphenylcyclohexylamino)-2-propanol

A solution of 10.00 grams (0.040 mole) of 4,4-diphenyl-cyclohexanone and 3.76 grams (0.050 mole) of 1-amino-2-propanol in 100 milliliters of methanol was shaken with 0.1 gram of Adams' catalyst at an initial hydrogen pressure of 61 pounds per square inch. The reaction was completed in three hours. The catalyst was filtered off and the filtrate was concentrated on a steam bath, finally under aspirator vacuum, to give 12.27 grams of oil. This was dissolved in 15 milliliters of methanol and acidified with 10.25 milliliters (0.040 mole) of hydrogen chloride in dry ether. Another 45 milliliters of dry ether was added and after 90 minutes the product was filtered, washed with two 10 milliliter portions of 1:4 methanol:ether, with two 10 milliliter portions of dry ether and dried to give 9.80 grams, a yield of 71 percent, of 1-(4,4-diphenylcyclohexylamino)-2-propanol hydrochloride, melting at 212–214 degrees centigrade.

*Analysis.*—Calculated for $C_{21}H_{28}ClNO$: C, 72.92; H, 8.16; Cl, 10.25. Found: C, 73.04; H, 7.97; Cl, 10.35.

Example 7.—3-(4,4-diphenylcyclohexylamino)-1,2-propanediol

A solution of 10.00 grams (0.040 mole) of 4,4-diphenylcyclohexanone and 4.56 grams (0.050 mole) of 3-amino-1,2-propanediol in 100 ml. of methanol was shaken with 0.1 gram of Adams' catalyst and hydrogen at an initial pressure of 60 pounds per square inch. When the hydrogenation had ceased the mixture was warmed to dissolve some crystals and filtered to remove the catalyst. The filtrate was concentrated on a steam bath, finally under aspirator vacuum, to give 13.8 grams of crystalline product; a sample of this, recrystallized from methanol, melted at 150–154 degrees centigrade. The unrecrystallized product was dissolved in 300 milliliters (0.040 mole) of chloroform, washed with three 10 milliliter portions of water and concentrated on a steam bath. Fifty milliliters of benzene was added and the mixture was concentrated to dryness to remove water. The residue was dissolved in 100 milliliters of methanol, acidified with 10.1 milliliters of hydrogen chloride in dry ether and concentrated until 12 milliliters of methanol remained; this was treated with 36 milliliters of ether. After standing overnight the product was filtered, washed with two 10 milliliter portions of 1:3 methanol:ether and with two 10 milliliter portions of dry ether and dried to give 11.97 grams of product melting at 180–192 degrees centigrade. Two additional crystallizations, from 1:2.5 and 1:2 methanol:ether, respectively, gave 9.45 grams or a 65 percent yield of 3-(4,4-diphenylcyclohexylamino)-1,2-propanediol hydrochloride melting at 196–202 degrees centigrade.

*Analysis.*—Calculated for $C_{21}H_{28}ClNO_2$: C, 69.69; H, 7.80; Cl, 9.80. Found: C, 69.52; H, 7.73; Cl, 9.76.

Representative compositions of this invention were shown to have anti-inflammatory activity when tested by the limb volume test method. Anti-inflammatory drugs such as cortisone will partially inhibit the swelling which occurs in the rat after subcutaneous injection of an irritating substance. In this test, the degree of swelling is determined by measuring the volume of the rat's hind foot before and 24 hours after a 2 percent water suspension of mustard powder or a 1 percent suspension of carrageenin is injected into the plantar surface of the foot. When active compounds are administered prior to the irritation, the degree of swelling seen is significantly less than seen in oil treated or untreated rats.

Male Sprague-Dawley rats weighing 140–160 grams are used, ususally in groups of 10. The animals are weighed before and after the experiment and food consumption is measured throughout the course of the experiment. Compounds are administered subcutaneously by injection or orally by stomach tube as oll suspensions. In every experiment an oil control group and a cortisone acetate treated group is run along with the test compound groups for purposes of comparison. The initial limb volume is measured in the afternoon just prior to the injection of the irritant into the foot. The final limb volume is measured 24 hours later. Five injections of the test substances are given as follows: two injections 8 hours apart on the day before the irritant, two injections 8 hours apart on the day of the irritant, and one injection the morning of the day after the irritant. Anti-inflammatory activity was also demonstrated by means of the anti-fibrosis test method.

Example 8.—N,N-bis(2-ethoxyethyl)-4,4-diphenyl-cyclohexylamine hydrochloride 45.00 grams of crude N,N-bis(2-ethoxyethyl)-4,4-diphenyl-1-cyclohexenylamine was diluted with 55 milliliters of methanol, treated with 400 milligrams of platinum oxide and hydrogenated at an initial pressure of 61 pounds per square inch. After 17 hours the hydrogen absorption had reached approximately 85 percent of theory. Fresh catalyst (250 milligrams) and 9.0 milliliters (0.15 mole) of glacial acetic acid were added and the hydrogenation was continued for an additional three hours, with little change in pressure. The mixture was warmed, the catalyst was filtered out, and the filtrate was concentrated on a steam bath, finally at 20 millimeters pressure to yield 52 grams of oil. This was treated with 100 milliliters of ether and a solution of 33 grams of 85 percent potassium hydroxide in 100 milliliters of water. The aqueous phase was separated, extracted with two 50 milliliter portions of ether and the united ethereal phases were washed with several 100 milliliter portions of water. The organic layer was dried over anhydrous magnesium sulfate, filtered and the filtrate was concentrated on a steam bath, at 20 millimeters pressure to an oily residue of 29.45 grams. This was dissolved in 50 milliliters of anhydrous ether and acidified with 14.0 milliliters (0.064 mole) of hydrogen chloride in anhydrous ether. The dark oily precipitate slowly crystallized on standing overnight at room temperature; it was filtered, washed with three 10 milliliter portions of anhydrous ether and dried to yield 24.03 grams of crude product.

This was dissolved in methanol, concentrated on a steam bath to 27 grams total weight and diluted with 100 milliliters of anhydrous ether to give an oil which soon crystallized on seeding and scratching. The product was filtered and washed with two 20 milliliter portions of two percent methanol in anhydrous ether and with 20 milliliters of anhydrous ether. The yield was 14.76 grams, melting at 109–111.5 degrees centigrade. Two similar recrystallizations of the mother liquor residue gave 3.46 grams of comparable purity. The combined fractions (18.22 grams) were recrystallized once more to yield 15.50 grams, a 45 percent yield of N,N-bis(2-ethoxyethyl-4,4-diphenylcyclohexylamine hydrochloride, melting at 112–113.5 degrees centigrade.

*Analysis.*—Calculated for $C_{26}H_{38}ClNO_2$: C, 72.28; H, 8.87; Cl, 8.21. Found: C, 72.05; H, 8.63; Cl, 8.31.

The local anesthetic activity of this compound is about 40 tmes procaine by standard test.

*Example 9.—3-{[bis(4-methoxyphenyl)cyclohexyl] (2-hydroxyethyl)amino}-1propanol hydrochloride*

Following the general method of Preparation 8, 24.00 grams of 4,4-bis(4-methoxyphenyl)cyclohexanone and 11.10 grams of 3-[(2-hydroxethyl)amino]-1-propanol yielded 34.90 grams of crude oily enamine, suitable for hydrogenation.

Following the general method of Example 1, the crude 3 - {[bis(4 - methoxyphenyl)cyclohexenyl] (2 - hydroxyethyl)amino}-1-propanol was hydrogenated and the product, after acidification with ethereal hydrogen chloride, was crystallized from 1:1.5 methanol:ether and from methanol to yield 17.46 grams of 3-{[bis(4-methoxyphenyl)cyclohexyl] (2 - hydroxyethyl)amino}-1-propanol hydrochloride, melting at 164–165 degrees centigrade.

*Analysis.*—Calculated for $C_{25}H_{36}ClNO_4$: C, 66.72; H, 8.06; Cl, 7.88. Found: C, 66.16; H, 8.22; Cl, 7.88.

*Example 10.—2-{[4,4-bis(4-methoxyphenyl)cyclohexyl] methylamino}ethanol hydrochloride*

Following the general method of Preparation 10, 16.00 grams of 4,4-bis(4-methoxyphenyl)cyclohexanone and 6.00 grams of 2-methylamino-ethanol yielded 19.50 grams of crude enamine, suitable for hydrogenation.

Following the general method of Example 3, the crude 2-{[4,4 - bis(4 - methoxyphenyl)cyclohexenyl]methylamino}ethanol was hydrogenated and the product, after acidification with ethereal hydrogen chloride, was crystallized from 1:2 methanol:ether and from methanol to yield 15.70 grams of 2-{[4,4-bis(4-methoxyphenyl)cyclohexyl] methylamino}ethanol hydrochloride, melting at 187–189 degrees centigrade.

*Analysis.*—Calculated for $C_{23}H_{32}ClNO_3$: C, 68.05; H, 7.95; Cl, 8.73. Found: C, 67.93; H, 7.90; Cl, 8.67.

*Example 11—N-(2-methoxyethyl)-4,4-bis(4-methoxyphenyl)cyclohexylamine hydrochloride*

Following the general method of Example 4, 15.40 grams of 4,4-bis(4-methoxyphenyl)cyclohexanone and 7.00 grams of 2-methoxyethylamine yielded, after crystallization from 1:4 methanol:ether and from isopropanol, 10.10 grams of N-(2-methoxyethyl)-4,4-bis(4-methoxyphenyl)cyclohexylamine hydrochloride, melting at 152–154 degrees centigrade.

*Analysis.*—Calculated for $C_{23}H_{32}ClNO_3$: C, 68.05; H, 7.95; Cl, 8.73. Found: C, 68.20; H, 8.24; Cl, 8.62.

*Example 12.—2-[4,4-bis(4-chlorophenyl)cyclohexylamino]ethanol hydrochloride hemihydrate*

Following the general method of Example 4, 15.2 grams of 4,4-bis(4-chlorophenyl)cyclohexanone yielded, after several crystallizations from methanol:ether and finally from methanol, 11.00 grams of 2-[4,4-bis(4-chlorphenyl)cyclohexylamino]ethanol hydrochloride hemihydrate, melting at 135–136 degrees centigrade.

*Analysis.*—Calculated for $C_{20}H_{25}Cl_3NO_{1.5}$: C, 58.62; H, 6.15; Cl, 25.96. Found: C, 58.35; H, 6.26; Cl, 25.80.

*Example 13.—1-{[4,4-bis(4-chlorophenyl)cyclohexyl] (2-hydroxyethyl)amino}-2-propanol*

Following the general method of Preparation 8, 14.60 grams of 4,4-bis(4-chlorophenyl)cyclohexanone and 6.80 grams of 1-[(2-hydroxyethyl)amino]-2-propanol yielded the crude oily enamine, suitable for hydrogenation.

Following the general method of Example 1, the crude 1 - {[4,4 - bis(4 - chlorophenyl)cyclohexenyl] (2-hydroxyethyl)amino}-2-propanol was hydrogenated and the product, after acidification with ethereal hydrogen chloride, was crystallized twice from 1:1 methanol:ether to yield 14.70 grams of 1-[4,4-bis(4-chlorophenyl)cyclohexyl] (2-hydroxyethyl)amino-2-propanol hydrochloride, melting at 243–244 degrees centigrade.

*Analysis.*—Calculated for $C_{23}H_{30}Cl_3NO_2$: C, 60.20; H, 6.59; Cl, 23.18. Found: C, 60.02; H, 6.83; Cl, 22.95.

*Example 14.—4-[4,4-bis(4-chlorophenyl)cyclohexyl] morpholine hydrochloride monohydrate*

Following the general method of Preparation 8, 15.00 grams of 4,4 - bis(4 - chlorophenyl)cyclohexanone and 16.30 grams of morpholine yielded 20.0 grams of crude enamine, suitable for hydrogenation.

Following the general method of Example 1, the crude 4-[4,4 - bis(4-chlorophenyl)cyclohexenyl]morpholine was hydrogenated and the crystalline product was treated with 30 milliliters of methanol, acidified with ethereal hydrogen chloride, and the crystallization completed by the addition of 30 milliliters of ether. After additional crystallizations from methanol and from isopropanol, there was obtained 12.67 grams of 4-[4,4-bis(4-chlorophenyl)cyclohexyl]morpholine hydrochloride monohydrate, melting at 224–227 degrees centigrade.

*Analysis.*—Calculated for $C_{22}H_{28}Cl_3NO_2$: C, 59.40; H, 6.34; Cl, 23.91. Found: C, 59.81; H, 6.48; Cl, 24.15.

*Example 15,—2-[4,4-bis(4-methoxyphenyl)cyclohexylamino]ethanol hydrochloride*

Following the general method of Example 4, 16.5 grams of 4,4-bis(4-methoxyphenyl)cyclohexanone yielded, after two recrystallizations from isopropanol, 19.56 grams of 2 - [4,4-bis(4 - methoxyphenyl)cyclohexylamino]ethanol hydrochloride, melting at 161–163 degrees centigrade.

*Analysis.*—Calculated for $C_{22}H_{30}ClNO_3$: C, 67.42; H, 7.72; Cl, 9.05. Found: C, 67.16; H, 7.72; Cl, 9.12.

*Example 16.—1-{[4,4-bis(4-methoxyphenyl)cyclohexyl] (2-hydroxyethyl)amino}-2-propanol hydrogen oxalate*

Following the general method of Preparation 8, 14.50 grams of 4,4 - bis(4 - methoxyphenyl)cyclohexanone and 6.70 grams of 1-[(2-hydroxyethyl)amino]-2-propanol yielded a quantity of pale yellow oil, the crude enamine, suitable for hydrogenation.

Following the general method of Example 1, the crude 1-{[4,4-bis(4-methoxyphenyl)cyclohexenyl](2 - hydroxyethyl)amino}-2-propanol was hydrogenated, taken up in ether and washed with water to remove the starting amino alcohol. The ethereal solution was dried and the free base was reacted with anhydrous oxalic acid to yield a gummy precipitate which was recrystallized twice from 1:2.5 methanol:ether to yield 14.21 grams of 1-{[4, 4 - bis(4 - methoxyphenyl)cyclohexyl](2 - hydroxyethyl)amino}-2-propanol hydrogen oxalate, melting at 155–157 degrees centigrade.

*Analysis.*—Calculated for $C_{27}H_{37}NO_8$: C, 64.40; H, 7.41. Found: C, 64.10; H, 7.35.

*Example 17.—2,2'[-4,4-bis(4-methylphenyl)cyclohexylimino]diethanol hydrochloride*

20.5 grams (ca. 0.0525 mole) of crude 2,2'-4,4-bis(4-methylphenyl)cyclohexenylimino diethanol was dissolved in 475 milliliters of methanol, treated with 500 milligrams of platinum oxide and hydrogenated at an initial pressure of 35 pounds per square inch, while heating at 40–50 degrees centigrade. After 24 hours the hydrogen uptake was approximately 90 percent of theory, and the catalyst was filtered off and the filtrate was concentrated from a steam bath to a thick oil. This was taken up in dichloromethane, washed with aqueous potassium hydroxide and with water and dried over anhydrous magnesium sulfate. This was filtered and the filtrate was concentrated to yield 19.1 grams of almost colorless oil.

This oil was dissolved in 15 milliliters of methanol and acidified with 10 milliliters (0.046 mole) of dry hydrogen chloride in ether. After an additional 35 milliliters of ether, seeding the mixture and standing at 0 degree centigrade for 30 minutes, the product was filtered, washed and dried. An additional similar crystallization yielded 16.20 grams of 2,2'[-4,4-bis(4-methylphenyl)cyclohexylimino]diethanol hydrochloride, melting at 161–163 degrees centigrade.

*Analysis.*—Calculated for $C_{24}H_{34}ClNO_2$: C, 71.35; H, 8.48; Cl, 8.78. Found: C, 71.55; H, 8.40; Cl, 8.62.

*Example 18.—2,2'-(4,4-diphenylcyclohexylimino) diethanol monocarbamate hydrochloride*

A solution of 20.37 grams (0.060 mole) of 2,2'-(4,4-diphenylcyclohexylimino)diethanol and 9.91 grams (0.132 mole) of methyl carbamate in 150 milliliters of chlorobenzene was stirred and the system dried by distilling out a small quantity of solvent. The solution was treated with 1.25 grams (0.006 mole) of aluminum isopropoxide and refluxed under a small vigreaux column with a variable take off distillation head for 22 hours while small quantities of distillate were removed at head temperatures of 65–75 degrees centigrade. The remainder of the solvent was distilled out, finally at 20 millimeters pressure and the residue was mixed thoroughly with 100 milliliters of chloroform plus 50 milliliters of water. The mixture was filtered and the clear chloroform phase was washed with 50 milliliters of water, diluted with a little fresh solvent and dried over anhydrous magnesium sulfate. The drying agent was filtered and the filtrate was concentrated in vacuo to leave a thick oily residue. This was dissolved in 35 milliliters of methanol and acidified with 0.055 mole of dry hydrogen chloride in ether, followed by sufficient dry ether to make the solvent 1:1.5 methanol:ether. The crystals which formed on standing overnight in the refrigerator were washed and dried to yield 9.14 grams of product, melting at 211–219 degrees centigrade. This was combined with 6.15 grams of similar material from another preparation and hot extracted from a soxhlet thimble into 75 milliliters of methanol. After crystallizing at room temperature for 2 hours, the product was filtered, washed and dried to yield 11.84 grams of 2,2'-(4, 4-diphenylcyclohexylimino)diethanol monocarbamate hydrochloride, melting at 220.5–224 degrees centigrade.

*Analysis.*—Calculated for $C_{23}H_{31}ClN_2O_3$: C, 65.94; H, 7.46; N, 6.69. Found: C, 65.64; H, 7.64; N, 6.66.

The mother liquors contain the corresponding dicarbamate which is isolated by convention procedures. Both compounds possess outstanding local anesthetic activity.

*Example 19.—2,2'-[4,4-bis(4-chlorophenyl)cyclohexylimino]diethanol hydrochloride*

By the general method used to prepare 2,2'-[4,4-bis(4-methoxyphenyl)cyclohexenylimino]diethanol, 17.00 grams of 4,4-bis(4-chlorophenyl)cyclohexanone was converted to 21.5 grams of crude 2,2'-[4,4-bis(4-chlorophenyl)cyclohexenylimino]diethanol.

The 21.5 grams of crude enamine was hydrogenated by the general method used with the bis(4-methoxyphenyl) enamine to yield, after acidification and crystallization from 1:1.5 methanol:ether, 11.47 grams of 2,2'-[4,4-bis (4 - chlorophenyl)cyclohexylimino]diethanol hydrochloride, melting at 190–193 degrees centigrade.

*Analysis.*—Calculated for $C_{22}H_{28}Cl_3NO_2$: C, 59.40; H, 6.34; Cl, 23.91. Found: C, 59.02; H, 6.32; Cl, 23.38.

*Example 20.—2,2'-[4,4-bis(4-methoxyphenyl)cyclohexylimino]diethanol hydrochloride*

31.5 grams of crude 2,2'-[4,4-bis(4-methoxyphenyl)cyclohexenylimino]diethanol was mixed with 100 milliliters of methanol and 0.5 gram of platinum oxide catalyst and hydrogenated at an initial pressure of 65 pounds per square inch. After 34 hours the hydrogen absorption had ceased at 93 percent of theory. The catalyst was filtered and the solvent was evaporated to leave a residue of 28.2 grams. This was dissolved in 100 milliliters of dichloromethane, washed with three 20 milliliter portions of water and dried over anhydrous magnesium sulfate. The drying agent was filtered and the filtrate was concentrated to an oil. This was dissolved in 35 milliliters of isopropanol and acidified with 0.051 mole of dry hydrogen chloride in ether. The crystalline product was recrystallized from 100 milliliters of isopropanol to yield 22.5 grams of 2,2' - [4,4 - bis(4 - methoxyphenyl)cyclohexylimino]diethanol hydrochloride, melting at 160.5–162 degrees centigrade.

*Analysis.*—Calculated for $C_{24}H_{34}ClNO_4$: C, 66.12; H, 7.86; Cl, 8.13. Found: C, 65.80; H, 7.58; Cl, 8.34.

This anti-inflammatory activity of this compound is outstanding

*Example 21.—2-(2,2-diphenylcyclohexylamino)ethanol hydrochloride*

A mixture of 20.08 grams (0.080 mole) of 2,2-diphenylcyclohexylamine in 25 milliliters of absolute ethanol was treated with a solution of 20.00 grams (0.16 mole) of 2-bromoethanol in 25 milliliters of absolute ethanol and refluxed for 17 hours. The solvent was distilled off at 20 millimeters pressure and the thick brown oil was mixed with 75 milliliters of ether and crystallized at room temperature. After two hours the product was filtered, washed with dry ether and dried to yield 24.32 grams of the hydrobromide salt, melting at 203.5–209.5 degrees centigrade.

This salt was mixed with 100 milliliters of dichloromethane and a solution of 10.6 grams of 85 percent potassium hydroxide in 25 milliliters of water. The organic layer was separated, washed with 20 milliliters of saturated aqueous sodium chloride solution and dried over anhydrous magnesium sulfate. The solid was filtered out and the filtrate was concentrated in vacuo to leave 19.15 grams of oily residue. This was dissolved in 20 milliliters of methanol and acidified with 14.6 milliliters (0.061 mole) of dry hydrogen chloride in either. Fresh solvents were added to adjust the medium to 25 milliliters of methanol plus 75 milliliters of ether. The product was filtered, washed with three 10 milliliter portions of 1:3 methanol: ether and with 25 milliliters of ether and dried to yield 14.73 grams of 2-(2,2-diphenylcyclohexylamino)ethanol hydrochloride, melting at 238–243 degrees centigrade. This was recrystallized from 40 milliliters of methanol plus 120 milliliters of ether to yield 14.30 grams, melting at 239–241.5 degrees centigrade.

*Analysis.*—Calculated for $C_{20}H_{26}ClNO$: C, 72.38; H, 7.90; Cl, 10.68. Found: C, 72.19; H, 8.11; Cl, 10.61.

The compound has pronounced local anesthetic activity and is a CNS stimulant.

What is claimed is:

1. Chemical compounds in which two phenyl groups are attached to the 4-position carbon atom of the cyclohexyl ring of cyclohexylamine and at least one oxy oxygen atom-bearing lower-alkyl group of up to eight carbon atoms is attached to the amino nitrogen atom, providing an at least two carbon atom bridge between the nitrogen atom and the oxygen atom, and wherein the oxy oxygen atom is contained in a member of the group consisting of hydroxy, lower-alkoxy and lower-acyloxy of 1 to 12 carbon atoms.

2. Chemical compounds in which two phenyl groups are attached to the 4-position carbon atom of the cyclohexyl ring of cyclohexylamine and at least one oxy oxygen atom-bearing lower-alkyl group of up to eight carbon atoms is attached to the amino nitrogen atom, providing an at least two carbon atom bridge between the nitrogen atom and the oxygen atom.

3. N - hydroxylower-alkyl-4,4-diphenylcyclohexylamine in which the oxy oxygen atom is separated from the amino nitrogen atom by at least two carbon atoms and wherein the lower-alkyl group contains up to eight carbon atoms.

4. N,N-bis(hydroxy - lower - alkyl)-4,4-diphenylcyclohexylamine in which the oxy oxygen atom is separated from the amino nitrogen atom by at least two carbon atoms and wherein the lower-alkyl group contains up to eight carbon atoms.

5. N - lower-alkoxy-lower-alkyl-4,4-diphenylcyclohexylamine in which the oxy oxygen atom is separated from the amino nitrogen atom by at least two carbon atoms and wherein the lower-alkyl group contains up to eight carbon atoms.

6. N,N-bis(lower - alkoxy - lower - alkyl)-4,4-diphenylcyclohexylamine in which the oxy oxygen atom is separated from the amino nitrogen atom by at least two carbon atoms and wherein the lower-alkyl group contains up to eight carbon atoms.

7. N - hydroxylower-alkyl-N-lower-alkyl-4,4-diphenylcyclohexylamine in which the oxy oxygen atom is separated from the amino nitrogen atom by at least two carbon atoms and wherein the lower-alkyl group contains up to eight carbon atoms.

8. N-lower-alkoxy-N-lower-alkyl - 4,4 - diphenylcyclohexylamine in which the oxy oxygen atom is separated from the amino nitrogen atom by at least two carbon atoms and wherein the lower-alkyl group contains up to eight carbon atoms.

9. 2,2'-(4,4-diphenylcyclohexylimino)diethanol.

10. N,N-bis(2-ethoxyethyl) - 4,4 - diphenylcyclohexylamine.

11. 2,2'-[4,4 - bis(4-methoxyphenyl)cyclohexylimino] diethanol.

12. 2,2' - [4,4-bis(4-chlorophenyl)cyclohexylimino]diethanol.

References Cited by the Examiner
UNITED STATES PATENTS

| | | | |
|---|---|---|---|
| 2,490,834 | 12/1949 | Rieveschl | 260—570 |
| 2,764,519 | 9/1956 | Villani | 260—570 X |

CHARLES B. PARKER, *Primary Examiner.*

L. ZITVER, *Examiner.*

VERA C. CLARKE, *Assistant Examiner.*